(12) United States Patent
Kramer et al.

(10) Patent No.: US 7,979,191 B2
(45) Date of Patent: Jul. 12, 2011

(54) METHOD FOR MONITORING A STARTING PROCESS OF A MOTOR VEHICLE

(75) Inventors: Rupert Kramer, Friedrichshafen (DE); Peter Herter, Ravensburg (DE); Ingo Sauter, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 409 days.

(21) Appl. No.: 12/373,822

(22) PCT Filed: Jun. 29, 2007

(86) PCT No.: PCT/EP2007/056535
§ 371 (c)(1),
(2), (4) Date: Jan. 14, 2009

(87) PCT Pub. No.: WO2008/015059
PCT Pub. Date: Feb. 7, 2008

(65) Prior Publication Data
US 2009/0312928 A1    Dec. 17, 2009

(30) Foreign Application Priority Data

Jul. 29, 2006   (DE) .......................... 10 2006 035 142

(51) Int. Cl.
*B60W 10/06*   (2006.01)
*F16D 48/08*   (2006.01)
*G06F 19/00*   (2006.01)

(52) U.S. Cl. .................... 701/84; 701/52; 701/64; 477/3

(58) Field of Classification Search .................... 701/84, 701/52, 55, 64, 67, 54, 56; 477/166, 181, 477/3, 176; 123/179.3; 290/40 C, 40 A
See application file for complete search history.

(56) References Cited

U.S. PATENT DOCUMENTS

| | | | |
|---|---|---|---|
| 6,742,487 B2 * | 6/2004 | Yamaguchi et al. | 123/179.3 |
| 6,942,594 B2 * | 9/2005 | Itoh et al. | 477/3 |
| 7,031,995 B2 | 4/2006 | Schmandt et al. | |
| 7,229,381 B2 * | 6/2007 | Niessen et al. | 477/3 |
| 7,300,384 B2 | 11/2007 | Eriksson et al. | |
| 7,329,206 B2 * | 2/2008 | Tanaka | 477/176 |
| 2003/0022759 A1 | 1/2003 | Frotscher | |
| 2004/0143383 A1 | 7/2004 | Kuepper et al. | |
| 2005/0071065 A1 | 3/2005 | Zimmermann et al. | |

FOREIGN PATENT DOCUMENTS

| | | |
|---|---|---|
| DE | 196 03 239 A1 | 7/1997 |
| DE | 199 21 920 | 11/2000 |
| DE | 100 31 771 A1 | 2/2001 |
| DE | 100 21 920 C1 | 7/2001 |
| DE | 102 21 263 A1 | 11/2002 |
| DE | 102 30 612 A1 | 2/2003 |
| DE | 10 2004 023 581 A1 | 12/2005 |
| DE | 10 2005 029 566 A1 | 2/2006 |
| DE | 10 2004 057 511 A1 | 6/2006 |
| WO | WO-2004/005744 A1 | 1/2004 |

* cited by examiner

*Primary Examiner* — Tan Q Nguyen
(74) *Attorney, Agent, or Firm* — Davis & Bujold, P.L.L.C.

(57) ABSTRACT

A method for monitoring a starting process of a motor vehicle, having a drive train including a driving motor, a torque transfer system and a transmission, a controller and an actuator, which is controlled by the controller for actuating the torque transfer system. Upon initiation of the starting process, if it is observed that the motor vehicle does not start, despite a clear starting request, appropriate measures for starting the motor vehicle are initiated.

2 Claims, 1 Drawing Sheet

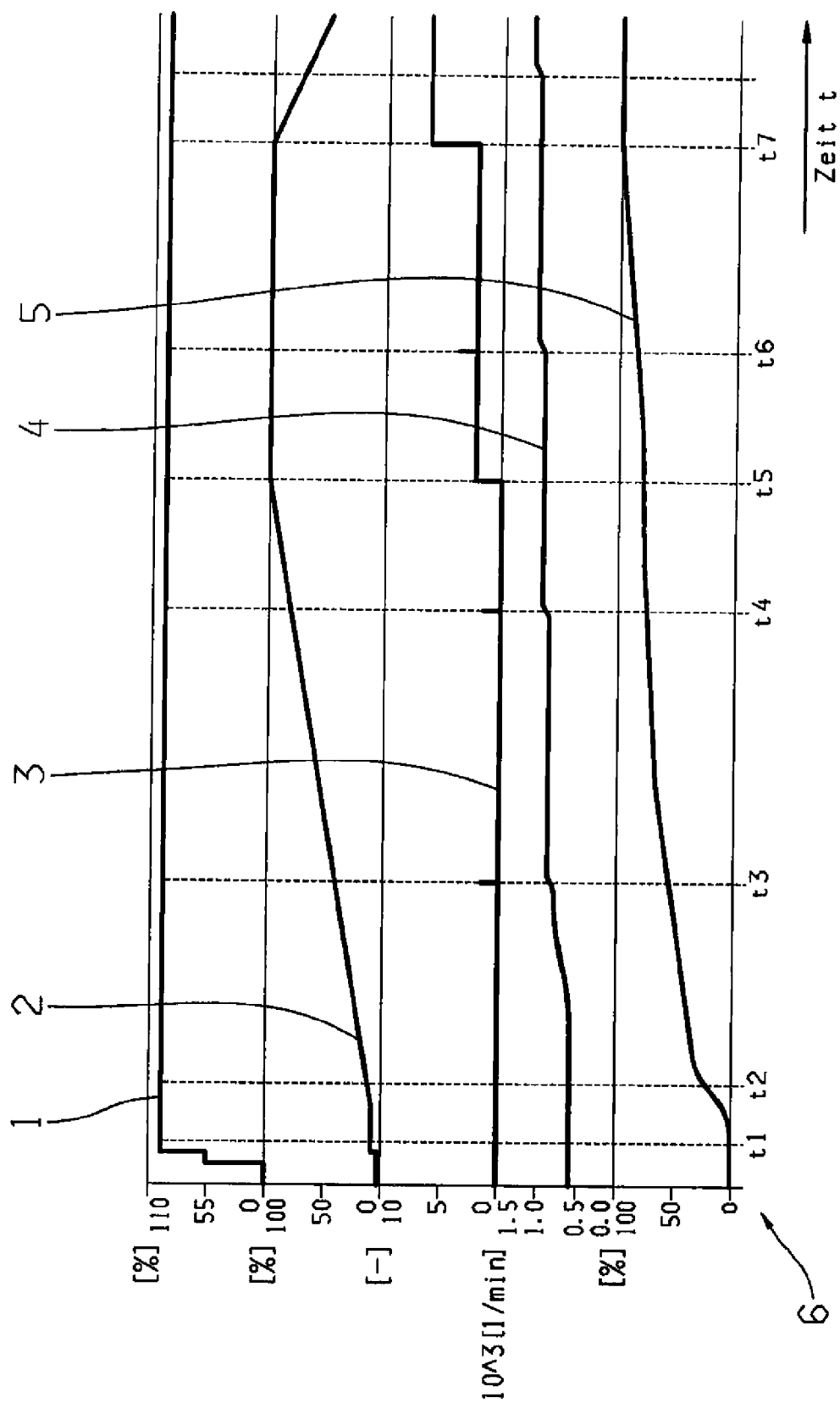

METHOD FOR MONITORING A STARTING PROCESS OF A MOTOR VEHICLE

This application is a national stage completion of PCT/EP2007/056535 filed Jun. 29, 2007, which claims priority from German Application Serial No. 10 2006 035 142.8 filed Jul. 29, 2006.

FIELD OF THE INVENTION

The invention relates to a method for monitoring a starting process of a motor vehicle.

BACKGROUND OF THE INVENTION

The main components of semi-automatic transmissions are conventional and, if need be, also manually actuatable shifting systems, in which the shifting and/or starting clutch between the driving motor and transmission as well as the selection and shifting of gears are actuated automatically using corresponding operating elements. These operating elements are typically configured as hydraulically or pneumatically actuatable piston/cylinder arrangements or electric actuators which act upon an actuating unit for the above transmission functions. The actuating unit can be provided on or in the transmission.

For the actuation of hydraulic or pneumatic operating elements, pressure-generating and control devices are required, which according to the state of the art comprise a hydraulic or pneumatic pump as the pressure-generating device, an accumulator and a hydraulic or pneumatic control unit with control valves and sensors, which are connected to a central control and regulating device and can be actuated by the same based on control and regulating functions stored there.

A drive train is known from DE 102 30 612 A1 for operating a motor vehicle. The drive train comprises a driving motor, a torque transfer system and a semi-automatic transmission. The torque transfer system can be automatically actuated by way of an actuator and the transmission has at least two shiftable gears with different ratios, wherein at least one gear of the transmission is used as the starting gear. A starting process is controlled by a controller using a characteristic starting line, which can be adjusted to a driving situation at least sometimes.

DE 100 31 771 A1 discloses a motor vehicle comprising a device for automatically actuating a clutch. The drive train of the motor vehicle comprises an engine, a transmission, a controller and an actuator controlled by the controlled for actuating the clutch. During a starting process, the torque to be transmitted by the clutch is increased and adjusted substantially to a specified torque value, wherein the torque to be transferred by the clutch is at least briefly increased and then lowered again before reaching the rotational speed uniformity between the engine rotational speed and the transmission rotational speed. In this way, more comfortable starting of the motor vehicle can be achieved.

It is common in semi-automatic transmissions having also semi-automatic clutches that existing functionalities are adjusted to an intended vehicle use with the help of a set of parameters. With the help of the parameter set, the handling can be influenced within certain ranges. It can be set to have more emphasis on comfort or performance. In such an adjustment of the driving behavior, it is always assumed that the components and assemblies considered vary only within sufficiently tight tolerances. The appropriate limits can be included in such an adjustment. If dependencies are known, adaptations or corrective curves can be employed in order to compensate for influencing factors that would change the handling.

The disadvantages of the state of the art are that, despite the manner or procedure mentioned above, during the operating time of a transmission unexpected variances may occur such that the control program with the adjusted parameter set does not result in the desired handling. It is possible that a vehicle cannot start because the programmed parameter set is not suited for overcoming the present driving situation. This can occur if one or more boundary conditions have drastically changed compared to the adjusted state. For instance, the transfer behavior of the clutch can be considerably lower; the engine power considerably worse and/or tractive resistance can be considerably higher.

Therefore the present invention is based upon the objective of providing a method for monitoring a starting process of a motor vehicle and eliminating the disadvantages of the state of the art.

The underlying objective of the invention is achieved by a representative method for monitoring a starting process of a motor vehicle having the characterizing features according to the main claim.

SUMMARY OF THE INVENTION

In order to safely detect, and if necessary control a driving situation, a starting observer is employed. By an observer a logic is generally understood which on the basis of suitable signals observes whether in a controller the events or processes occur for the purpose of which the function was used.

The starting observer is intended to detect whether a vehicle, in fact, starts moving if the driver wants to start. The starting observer has the following tasks:
 detecting whether starting is desired,
 detecting whether starting occurs,
 initiating measures that support starting, if no starting occurs despite a starting request, and
 protecting the components if starting has failed.

A clear starting request can be derived from the angle of the gas pedal. If the gas pedal angle is quite large, for example greater than 90%, the starting observer assumes that a clear starting request exists. If a clear starting request exists, a stored normal function of the controller with the corresponding parameter set, generally within a measurable period, causes the vehicle to move. If the vehicle does not start to move within a specifiable observation period, despite the request for starting, the starting observer initiates measures in the control program that differ from normal operation.

The following measures can be taken to support the starting process.

raising the target engine rotational speed and optionally slightly opening of the clutch. This process corresponds to the remedial measure that a drive using a manual transmission and clutch pedal would perform to achieve starting. As a rule, this causes the engine to be able to build greater torque than is typically required during normal operation. These measures can be repeated cyclically. By increasing the rotational engine speed, starting can occur at higher torque than during normal operation. The slight opening of the clutch is not absolutely necessary.

Furthermore, it is observed whether in conjunction with the measures initiated (increasing the target engine rotational speed and optionally slightly disengaging the clutch) a starting process occurs. If this is not the case, after another period the clutch can be forcibly engaged in order to transfer the higher torque present at the engine promptly to the wheels of the vehicle. The process, which may be regulated during normal operation, is replaced with a controlled process.

If these two measures (increasing the target engine rotational speed and optionally slightly opening the clutch, as well as forcibly disengaging the clutch) do not result in a starting of the motor vehicle, it is finally ensured that the components required for the starting process are protected from destruction, particularly the clutch and the engine. For this purpose, after another period and/or if a threshold value has been exceeded for the applied clutch energy, the engine torque is decreased by intervention, for example via a data bus. This results either in starting or stalling of the engine. After letting go of the gas pedal, this state or these initiated measures, are canceled and additional starting attempts can be performed.

BRIEF DESCRIPTION OF THE DRAWING

The invention will now be described, by way of example, with reference to the accompanying drawing in which:

The sole FIGURE of this drawing shows a representation of different vehicle parameters as a function of time t.

DETAILED DESCRIPTION OF THE INVENTION

In a diagram 6, the characteristic curves for a gas pedal position 1, a engine torque 2, a target engine rotational speed 4, a clutch position 5, and a characteristic 3 are represented on the basis of which the measures initiated become apparent. At a time t1, the starting observer proceeds from the assumption of a clear starting request since the gas pedal position is greater than 90%. The stored normal function of the controller, with the stored parameter set, does not cause the motor vehicle to start yet at time t2. If the vehicle does not start moving within a specifiable observation period, despite the request for starting, the starting observer initiates measures in the control program that differ from normal operation. After this observation time has expired, at time t3 the engine rotational speed is increased, which is apparent from characteristics 3, 4. This causes the engine to be able to build greater torque than is typically required during normal operation. At time t4, if still no starting has occurred, the engine rotational speed is increased again. Since after repeatedly increasing the target engine rotational speed, still no starting has occurred, at the time t5, the clutch is forcibly engaged, which is illustrated by the characteristic curves 3, 5. The forcible engaging of the clutch occurs over a specifiable time period between the times t5 and t7. Despite the forcible engaging of the clutch initiated, if at the time t6 still no starting occurs, the engine rotational speed is again increased at the time t6 as a result of this. At the time t7, the clutch is completely engaged. If despite increasing the target engine rotational speed several times and forcibly engaging the clutch, no starting still occurs at the time t7, at this time the engine torque is decreased in order to protect the components required for starting, particularly the engine and the clutch. Increasing the engine rotational speed can be repeated several times during a starting attempt at cyclically specifiable intervals t3, t4, t6.

REFERENCE NUMERALS 1 gas pedal position
2 engine torque
3 characteristic curve "measures initiated"
4 target engine rotational speed
5 clutch position
6 diagram t time

The invention claimed is:

1. A method for monitoring a starting process of a motor vehicle having a semi-automatic shifting system, a drive train with a driving motor, a torque transfer system and a transmission, a controller and an actuator controlled by the controller for actuating the torque transfer system, the method comprising the steps of:
 a) detecting whether starting is requested;
 b) detecting whether starting occurs following a clear starting request;
 c) if, despite a starting request, no starting occurs, increasing the drive motor rotational speed, and optionally slightly disengaging the torque transfer system, which generally allows the drive motor to build greater torque than is typically required during normal operation of the starting process;
 d) checking whether measures initiated result in starting, and repeating step c) if no starting has occurred;
 e) forcibly engaging the torque transfer system after a specifiable time period, if the measures initiated in step c) still do not result in starting, as a result of which the higher torque present at the driving motor is promptly transmitted to wheels of the motor vehicle, wherein a process, regulated during normal operation, is replaced by a controlled process;
 f) protecting components required for starting from destruction, if the measures initiated in steps c) and e) do not result in starting of the motor vehicle, wherein after at least one of another specifiable time period and when a threshold value for a stored clutch energy has been exceeded, engine torque is reduced by intervention;
 g) resetting a failed starting process by canceling gas pedal actuation; and
 h) enabling renewed starting attempts.

2. A method of commencing movement of a motor vehicle having a semi-automatic shifting system, a drive train with a driving motor, a torque transfer system and a transmission, a control device and an actuator, which is controlled by the control device for actuating the torque transfer system, the method comprising the steps:
 monitoring a gas pedal and determining that a request for commencing movement of the motor vehicle has been made when the gas pedal is actuated;
 monitoring the motor vehicle for movement following a determination that a request for commencing movement of the motor vehicle has been made;
 Initiating measures to increase engine rotational speed and, at most, partially disengage the torque transfer system such that drive motor torque increases above a typical drive motor torque needed to commence movement of the motor vehicle during a normal movement commencing operation, if motor vehicle movement is not detected and a request for commencing movement of the motor vehicle has been made;
 monitoring the motor vehicle for movement and cyclically repeating within a set time period the measures initiated to increase the engine rotational speed and, at most, partially disengage the torque transfer system, if no motor vehicle movement is detected;
 engaging the torque transfer system after expiration of the set time period, if no motor vehicle movement is detected within the set time period such that the increased drive motor torque is transmitted to wheels of the motor vehicle and a controlled process for commencing movement of the motor vehicle is initiated;

reducing the increased drive motor torque, after at least one of a second set time period has expired and a stored clutch energy threshold value has been exceeded, to prevent the damage of components utilized in commencing movement of the motor vehicle, if no motor vehicle movement is detected;

canceling the request for commencing movement of the motor vehicle; and enabling re-initiation of the method of commencing movement of the motor vehicle.

* * * * *